Feb. 5, 1929.  
J. A. DYKES  
1,700,926

COTTON HARVESTER AND CLEANER

Filed March 23, 1927  2 Sheets-Sheet 1

John A. Dykes
INVENTOR.

BY Loyal J. Miller
ATTORNEYS.

Patented Feb. 5, 1929.

1,700,926

UNITED STATES PATENT OFFICE.

JOHN A. DYKES, OF EL RENO, OKLAHOMA.

COTTON HARVESTER AND CLEANER.

Application filed March 23, 1927. Serial No. 177,793.

My invention relates to improvements in cotton harvesters and cleaners, and the object of my invention is to produce a device of the character described, which will be: new, novel, simple, cheap, durable, strong, efficient and of utility; easily and cheaply operated; which will gather and clean a very large percentage of all the bolls and cotton in the field by once going over the same.

Figure 1:
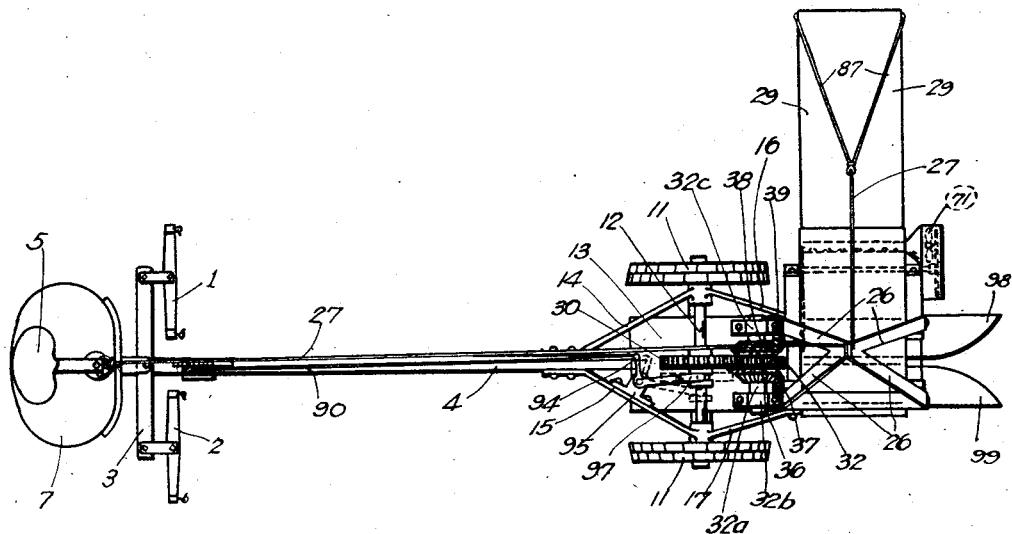
Figure 2:
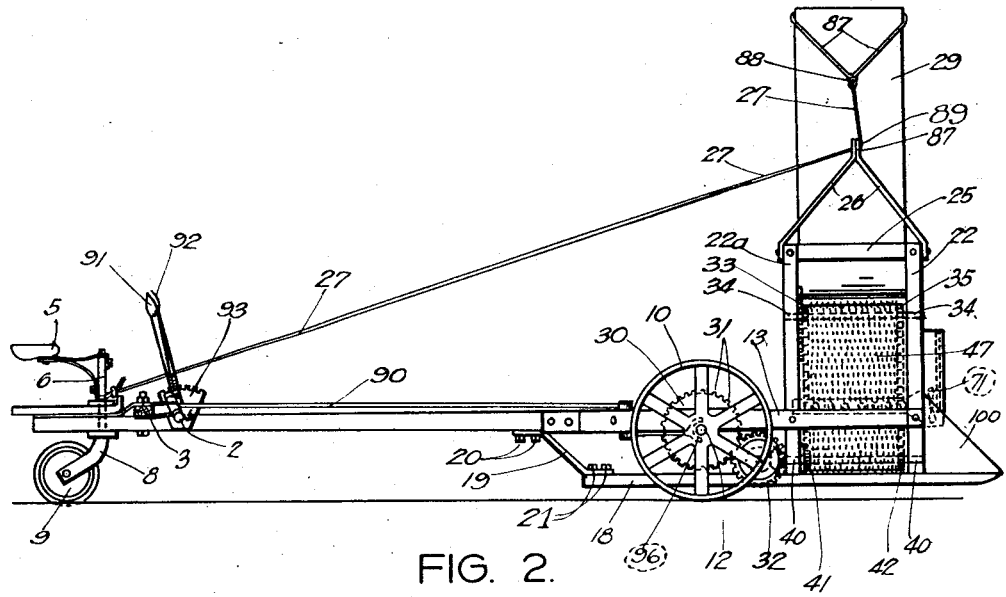
Figures 3, 4:
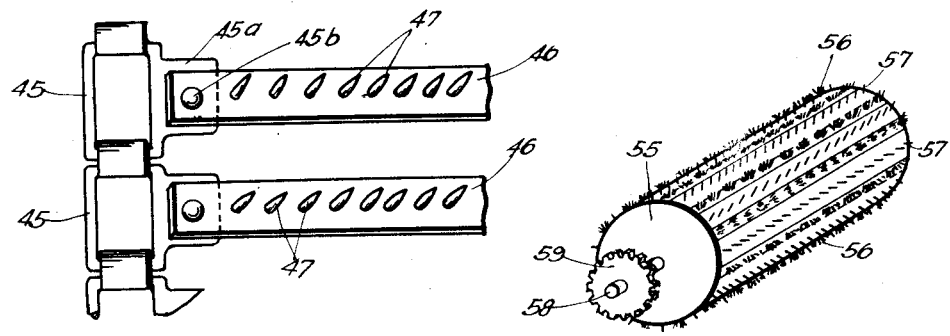
Figure 5:
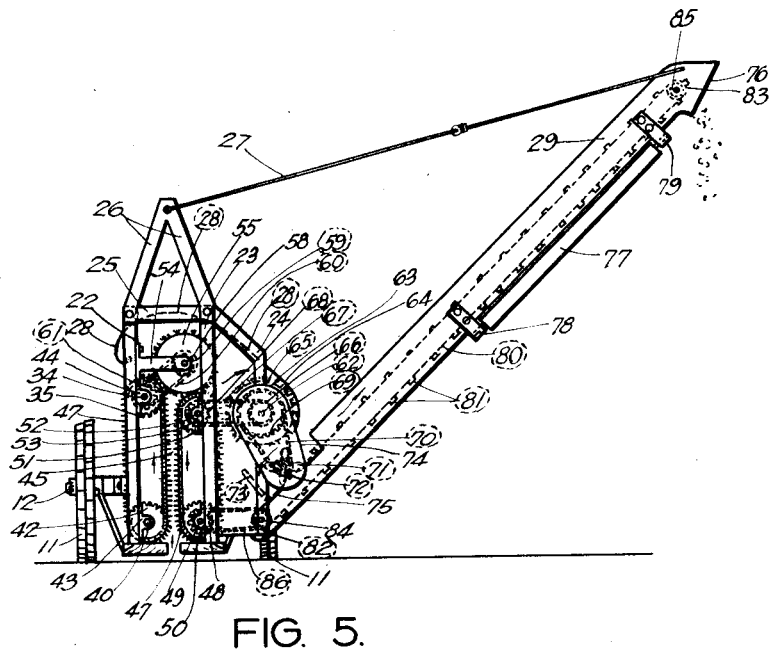

Those and other objects and the novelty and invention will more fully appear from the specification, claims, and two sheet drawings, of which, Figure 1 is a plan view of the cotton harvester and cleaner Figure 2 is a side elevation view of the machine; Fig. 3 is a fragmentary view of part of the chain and a part of two of the combing strips riveted between the links; Fig. 4 is a perspective view of the spiked drum; Fig. 5 is a front elevation view with the front guard removed.

Like characters of reference designate like parts in all the figures.

One embodiment of my invention and the manner of applying the same is as follows. The preferred power for the propelling and operation of my device is a team of horses (which power is found to be amply sufficient), hitched to singletrees 1, 2, and doubletrees 3, attached to a tongue member 4 attached at its front end to the device; it is preferably driven from the rear, the driver sitting on seat 5 fastened rigidly on upstanding standard 6 over platform 7 supported by fork 8 integral with said standard 6 and rotatable therewith and is turned backwardly of said standard 6 permitting the trailer wheel 9 to be drawn and to follow rather than to be pushed, and to permit the operator to guide the machine by a turning of his body from one side to the other. Its connection with the other parts will be more particularly explained later. My machine is intended by a single unit thereof to harvest a single row of cotton at a time; although if desired a greater number of units thereof may be provided and a greater power means attached and used for propelling and operating the aggregate number of units as is desirable. The machine runs on two wheels 10, each provided with traction surfaces 11, on a main axle 12. The device is supported by a main body frame 13 rigidly connected to said tongue member 4, metallic bracing arms 14, 15, 16, 17, and an underswung lower frame 18, rigidly connected to said tongue member 4 by a metallic bracing arm 19 and bolts 20, 21. An upright frame construction 22, 22ª, 23, 24, with cross-section bracing member 25 is rigidly attached to said main body frame 13 and underswung frame 18 being adapted to support the operating parts of the device, said upright frame having an apex frame 26 thereabove anchoring a raising and lowering support 27 for elevator 29; a housing 28 adapted to house the frame work and operating mechanism of the device. A spur wheel 30 having cogs 31 fastened centrally on said main axle 12 meshes with a pinion 32 fastened on a jack-shaft 32ª, constituting a spur gear. Said jack-shaft 32ª is fastened to said frame 13 by clamping members 32ᵇ, 32ᶜ. Fastened on each side of said pinion 32 on said jack-shaft 32ª is a bevel gear 36, 37, and 38, 39. Said bevel gears, or pinions, 37 and 39 connect by a shaft as shown at 40 to a chain sprocket as shown at 41; a second chain spocket as shown at 42 is fastened to said shaft 40 near its outer end as shown in Fig. 2. The detail of the second shaft and sprockets leading from bevel gear or pinion 39 is not fully shown but it is identical with the ones described leading from bevel gear 37. The front view in Fig. 5, however, shows said shaft at 49. Vertically above said chain sprocket 42 is a third chain sprocket 35 operating on shaft 34, said shaft 34 being parallel with shaft 40; on the other end of said shaft 34 is a like chain sprocket 33. Said shaft 40 has a bearing at one end in shaft-boxing 43 and is fastened at the front on the lower inside portion of frame member 22 and at its rear on the lower inside portion of frame member 22ª; shaft 34 at its front end has a bearing thereabove on shaft-boxing 44 on the inside central portion of said frame member 22, and at its rear end on the inside central portion of said frame member 22ª. I provide chains composed of links 45, said links being adapted to join together forming the chains, said chains are adapted to travel on chain sprockets 41 and 33, 42 and 35, 48 and 51, and companion sprockets to said 48 and 51 (not numbered). Said sprockets 48 and 51 are fastened to and move with shafts 49 and 52, respectively, which have bearings on shaft-boxings 50, 53, respectively, on the inside surface of frame member 23. The companion sprockets with said sprockets 48 and 51 are similarly anchored on shafts, and shaft-boxings on the inside of companion frame member to frame member 23; cleats or rungs 46 are similarly fastened to said links 45 by rivets or holding means 45$^b$ to side extension 45$^a$ on said companion sprockets forming a traveling ladder, having spikes 47 on its outer surfaces. Each of said links has on one lateral side an extension 45$^a$ adapted to be joined by rivets or holding means 45$^b$ to a flat rung 46. Said rungs are fastened to said extensions 45$^a$ at one end, and similarly fastened at the other end to a similar side extension on another similar chain forming a movable ladder. On each of said cleats or rungs 46, on their outer surfaces is a plurality of regularly spaced upstanding short spikes 47 adapted to separate the cotton and cotton bolls from the plants and débris and to carry them upwardly therefrom and to convey them to the cleaner hereinafter described and to the elevator later described. Both of said chains and the machinery running them are so arranged that the chains and spikes thereon move upwardly on the inside of said sprockets and downwardly on the outside thereof as indicated by the arrows in Fig. 5.

It will be observed that shaft 34 is vertically above said shaft 40 and they are parallel; that shaft 52 is vertically above said shaft 49 and that they are parallel, and that 52 is anchored on frame member 23 at a point lower than shaft 34 is anchored on frame member 22 and 22$^a$. Bracket arms 54 fastened to the inside of frames 22 and 22$^a$ by bolts, above said shaft 34 and shaft 52, support a brush and spike drum 55, having rows of spikes 57 alternating on the surface of said drum with rows of brushes 56, revoluble on a shaft 58 and operated with a sprocket 59 and a belt 60; the other end of said belt 60 operating from said shaft 34 on a second sprocket 61 thereon. Said belt 60 and brush and spike drum 55 are adapted to conduct and guide the cotton, bolls, and the like, from the place to which they have been elevated by rungs 46 and linked chains 45 in the direction of the arrows towards cylinder roll and fan hereinafter described, and the bottom of the elevator 29. Sprocket 61 operated by belt 60 on shaft 34 turns in the same direction as chain 45. Said belt 60 also turning sprocket 59 causes drum 55 to be turned in the same direction. The periphery of said drum 55 and the periphery of said rung elevator operating on shafts 40 and 34 being close together, and said drum 55 being higher in said frame than rung elevator on shafts 48 and 52 the revolutions of said drum 55 cause the current of air to be guided beneath said drum 55 and over said shorter rung elevator outwardly and thereby guides the cotton, bolls, and the like over said shorter rung elevator in the direction of said cylinder roll 63 and fan 71. Another shaft 62 anchored to frame 24 turns a cylinder roll 63 having brush 64 and spikes 65 on its periphery. This operates by a sprocket 66 on shaft 62 and a belt or chain 67 and sprocket 68 on shaft 52. A larger sprocket 69 on the end of said cylinder roll 63 at its front end with chain 70 operates fan 71 by a small sprocket 72. Said chain 67 is operated from the rear end of shaft 52. The sprocket 66 being larger, and sprocket 72 operating said fan being smaller, operates the fan at a greater rate of speed. It is intended to have this fan operate at a speed sufficient to carry the débris over the baffle board 73 and away from the entrance 75 to the lower portion of the elevator, but not sufficiently fast to carry the cotton, bolls, and the like away from said elevator, and over the baffle board. The baffle board also is designed to prevent the débris from going back to be again raised by the two spiked conveyors, 45, 46, 47. I also provide a partial housing 74 for said fan 71 and chain 70 adapted to provide better direct use of the fan for the purposes for which it is to be used.

Adjacent said fan and baffle board is the lower end of an elevator 75, said elevator being housed by housing 29 having a mouth 76 where the cotton and products to be saved are carried out over and emptied into a wagon drawn alongside the harvester for that purpose. A roller 77 anchored at 78 and 79 is provided to prevent the elevator housing 29 from rubbing on and being beaten to pieces on the wagon bed, and preventing the independent movement of the elevator, and harvester from being interfered with. The elevator 80 is preferred to be of the canvas type having a plurality of cleats 81 regularly spaced thereon. This elevator belt chain 80 is rotatably movable on sprockets 82, 83, on shafts 84, 85, and is operated by sprocket 82 on said lower shaft 84 and by belt 86 on sprocket 48. Said elevator 80 and housing 29 are supported by bifurcated supporting rod 87, anchored to raising and lowering rope 27 at 88 passing through strap irons 26 centering at 89, said rope being anchored and tied around standard 6. An operating rod 90 controlled and regulated by lever 91, releasing member 92 and segment 93 operates a bell-crank 94 pivoted on bracket 95 to bracing rod 15. Said outer end of the bell-crank member is bifurcated at 96 and fits in a channel in the gear on said hub. When said handle 91 is thrust forward, bell-crank 94 is also thrust forward and causes outer end 97 thereof to move said channel and gear on said axle thereby throwing the gear 30 and pinion 32 out of gear, and releasing the connection to the operating parts of the harvester.

The front guiding arms 98, 99, are rounded inwardly from their outer surfaces toward a common center and an additional guard 100 is provided to cause the material to be worked on to be elevated after the harvester begins striking the row of cotton.

In operation wheels 10 straddle a single row of cotton and guards 98 and 99 cause the branches of the cotton plant and the cotton and bolls thereon to be guided forwardly and their outer portions to be drawn towards the center between spiked conveyors 45, 46; the spur gear 30 being turned by axle 12 turns pinion 32, this turns jack-shaft 32ª and bevel gears 36, 38, and these operate on bevel gears 37 and 39 turning shafts 40, 49, and sprockets 42, 35, 48, 51, on these shafts operate spiked conveyors 46 which travel upwardly on the inside of said sprockets and downwardly on the outside, carrying the cotton bolls, cotton, and other materials stripped off of the cotton plants upwardly between said conveyors to the drum or upper stripper roll 55 turning counter-clockwise on shaft 58 seated on arm 54. This stripper roll strips the cotton, bolls and the like off of the conveyors and with the belt turning the same carries the material between the stripper roll and upper end of the shorter conveyor and over its top to a second drum or roll 63 which turns clockwise and further breaks up the bolls and separates the cotton therefrom, and from the débris and throws it over the top and down towards the lower entrance 75 of the elevator 80 where it approaches adjacent the fan 71 at which point the cotton with the seeds is thrown towards said entrance 75 and the débris is thrown over the baffle board 73 and is from there allowed to fall to the ground. The cotton, however, is from there carried on the canvas cleated elevator 80 to the mouth 76 of the upper end of said elevator, where it is emptied into a wagon box, or other receptacle.

From the description and the accompanying two sheet drawings, the specifications, and the appended claims, the advantages of construction, application and working of the machine, will be apparent to those skilled in the art to which my invention pertains. I have entered into a detailed description of the construction and the relative arrangement of the parts embraced in the present and preferred embodiment of my invention in order to impart a full, clear and exact understanding of the said embodiment. I do not desire, however, to be understood as confining myself to the specific construction and relative arrangement of the parts inasmuch as in the future practice of the invention various changes and modifications may be made as fall within the scope of my invention as defined in my appended claims.

Having thus fully described the invention, what is claimed and desired to be secured by Letters Patent, is:

1. A cotton harvesting machine of the class described, comprising two conveyors projecting upwardly from its front, adapted to comb the cotton plants, two stripping and breaking-up cylinders being adapted to separate the cotton and bolls from the débris, and to break up the bolls and separate the cotton therefrom, a fan operable from one of said cylinders being adapted to drive the cotton products to an elevator and the débris away therefrom, an elevator adapted to elevate and load the cotton products, guides for positioning said plants between said conveyors, guiding means for guiding said device, propelling means being adapted for propelling said device, a supporting frame and housing for housing said device and for anchoring said shafts, substantially as described.

2. The combination, in a cotton harvesting machine as described, of guides for positioning the cotton plants for combing, a plurality of lifting conveyors having external brushes and spikes and being adapted for combing the cotton plants, a stripper cylinder drum having brushes and spikes on its periphery for stripping, breaking up and separating the cotton and bolls from the débris, being operable counter-clockwise on an upper shaft by a sprocket and chain from another sprocket operating one of said conveyors, a second cylinder roll, a fan connecting therewith, a baffle board, said roll, fan and baffle board being adapted for carrying the cotton and bolls towards the elevator and the débris away from the elevator, an elevator for elevating and carrying the product to a carrier as desired, propelling means adapted for connecting with and operating said conveyors, drums, fan and elevator, means for guiding said propelling means and said conveyors, drums, fan and elevator, a supporting frame and housing for said device, and for anchoring said shafts.

3. A cotton harvesting machine of the class described, comprising two spiked conveyors for combing the cotton plants, the first being adapted to travel upward and to turn counter-clockwise, the second being adapted to travel upward and to turn clockwise on sprockets and shafts, a stripping cylinder drum having brushes and spikes on its periphery for stripping, breaking up and separating the cotton and bolls from the débris turning counter-clockwise on an upper shaft operable by a sprocket and chain from a sprocket on said conveyor turning counter-clockwise, a second cylinder drum having brushes and spikes on its periphery, a fan, a baffle board, said second cylinder drum, fan and baffle board being adapted for carrying the cotton and bolls towards the elevator and the débris away from it, said second drum revolving clockwise operable by a sprocket and chain from another sprocket on said conveyor revolving clockwise and operable by a small sprocket and chain from a large sprocket on said second drum, an elevator for elevating and carrying the cotton and bolls to a carrier, propelling means being adapted for connecting with and operating said conveyors, drums, fan and elevator, means for guiding said propelling means, conveyors, drums, fan and elevator, a supporting frame and housing for housing said device and for anchoring said shafts.

JOHN A. DYKES.